United States Patent
Uno

(10) Patent No.: US 6,975,568 B2
(45) Date of Patent: Dec. 13, 2005

(54) DISC PLAYER AND RECORDER-CONTENT INFORMATION DISPLAY METHOD FOR THE SAME

(75) Inventor: Kouichi Uno, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 371 days.

(21) Appl. No.: 10/346,569

(22) Filed: Jan. 17, 2003

(65) Prior Publication Data

US 2003/0147317 A1    Aug. 7, 2003

(30) Foreign Application Priority Data

Jan. 21, 2002 (JP) .............................. 2002-011167

(51) Int. Cl.[7] .............................................. G11B 7/00
(52) U.S. Cl. ............................... 369/47.16; 369/30.04
(58) Field of Search .................... 369/30.04, 30.25, 369/47.16, 53.37

(56) References Cited

U.S. PATENT DOCUMENTS 5,737,308 A * 4/1998 Nakai et al. ............. 369/275.2
6,301,638 B1    10/2001 Suzuki et al.
6,341,108 B1 *   1/2002 Ishizuka ...................... 369/47.1
6,519,676 B1 *   2/2003 Suzuki et al. ............... 711/112
2001/0040842 A1 * 11/2001 Yokota et al. ................ 369/32

* cited by examiner

*Primary Examiner*—William Klimowicz
*Assistant Examiner*—Lixi Chow
(74) *Attorney, Agent, or Firm*—Brinks Hofer Gilson & Lione

(57) ABSTRACT

A disc has a first area for recording musical data and a second area for recording information (first-area recorded-content information) related to the content of what is recorded in the first area. In each block constituting the second area, a character code of the block and language codes of all blocks are recorded in addition to the first-area recorded-content information. The disc is loaded into a disc player. When a system controller in the disc player reads the first-area recorded-content information from a designated block and displays it, the system controller counts and saves a read count corresponding to the language code of the block. When a new disc is played back, first-area recorded-content information is read from a block having a language code which has the maximum count and displayed in a language corresponding to the language code.

14 Claims, 16 Drawing Sheets

FIG. 2

| ID1 | ID2 | ID3 | ID4 | TEXT1 | TEXT2 | TEXT3 | TEXT4 |
|---|---|---|---|---|---|---|---|
| TEXT5 | TEXT6 | TEXT7 | TEXT8 | TEXT9 | TEXT10 | TEXT11 | TEXT12 |

FIG. 4

| ID1 | ID2 | ID3 | ID4 | TEXT1 | TEXT2 | TEXT3 | TEXT4 |
|---|---|---|---|---|---|---|---|
| "8F" | PACK ELEMENT ="00" | SEQUENCE NUMBER | BLOCK NUMBER | PRESENT-BLOCK CHARACTER CODE | FIRST TRACK NUMBER | LAST TRACK NUMBER | MODE2 & COPY PROTECTION INFORMATION |
| TEXT5 | TEXT6 | TEXT7 | TEXT8 | TEXT9 | TEXT10 | TEXT11 | TEXT12 |
| NUMBER OF PACKS AT ID1="80" | NUMBER OF PACKS AT ID1="81" | NUMBER OF PACKS AT ID1="82" | NUMBER OF PACKS AT ID1="83" | NUMBER OF PACKS AT ID1="84" | NUMBER OF PACKS AT ID1="85" | NUMBER OF PACKS AT ID1="86" | NUMBER OF PACKS AT ID1="87" |
| ID1 | ID2 | ID3 | ID4 | TEXT1 | TEXT2 | TEXT3 | TEXT4 |
| "8F" | PACK ELEMENT ="01" | SEQUENCE NUMBER | BLOCK NUMBER | NUMBER OF PACKS AT ID1="88" | NUMBER OF PACKS AT ID1="89" | NUMBER OF PACKS AT ID1="8A" | NUMBER OF PACKS AT ID1="8B" |
| TEXT5 | TEXT6 | TEXT7 | TEXT8 | TEXT9 | TEXT10 | TEXT11 | TEXT12 |
| NUMBER OF PACKS AT ID1="8C" | NUMBER OF PACKS AT ID1="8D" | NUMBER OF PACKS AT ID1="8E" | NUMBER OF PACKS AT ID1="8F" | LAST SEQUENCE NUMBER OF BLOCK 0 | LAST SEQUENCE NUMBER OF BLOCK 1 | LAST SEQUENCE NUMBER OF BLOCK 2 | LAST SEQUENCE NUMBER OF BLOCK 3 |
| ID1 | ID2 | ID3 | ID4 | TEXT1 | TEXT2 | TEXT3 | TEXT4 |
| "8F" | PACK ELEMENT ="02" | SEQUENCE NUMBER | BLOCK NUMBER | LAST SEQUENCE NUMBER OF BLOCK 4 | LAST SEQUENCE NUMBER OF BLOCK 5 | LAST SEQUENCE NUMBER OF BLOCK 6 | LAST SEQUENCE NUMBER OF BLOCK 7 |
| TEXT5 | TEXT6 | TEXT7 | TEXT8 | TEXT9 | TEXT10 | TEXT11 | TEXT12 |
| LANGUAGE CODE OF BLOCK 0 | LANGUAGE CODE OF BLOCK 1 | LANGUAGE CODE OF BLOCK 2 | LANGUAGE CODE OF BLOCK 3 | LANGUAGE CODE OF BLOCK 4 | LANGUAGE CODE OF BLOCK 5 | LANGUAGE CODE OF BLOCK 6 | LANGUAGE CODE OF BLOCK 7 |

FIRST PACK / SECOND PACK / THIRD PACK

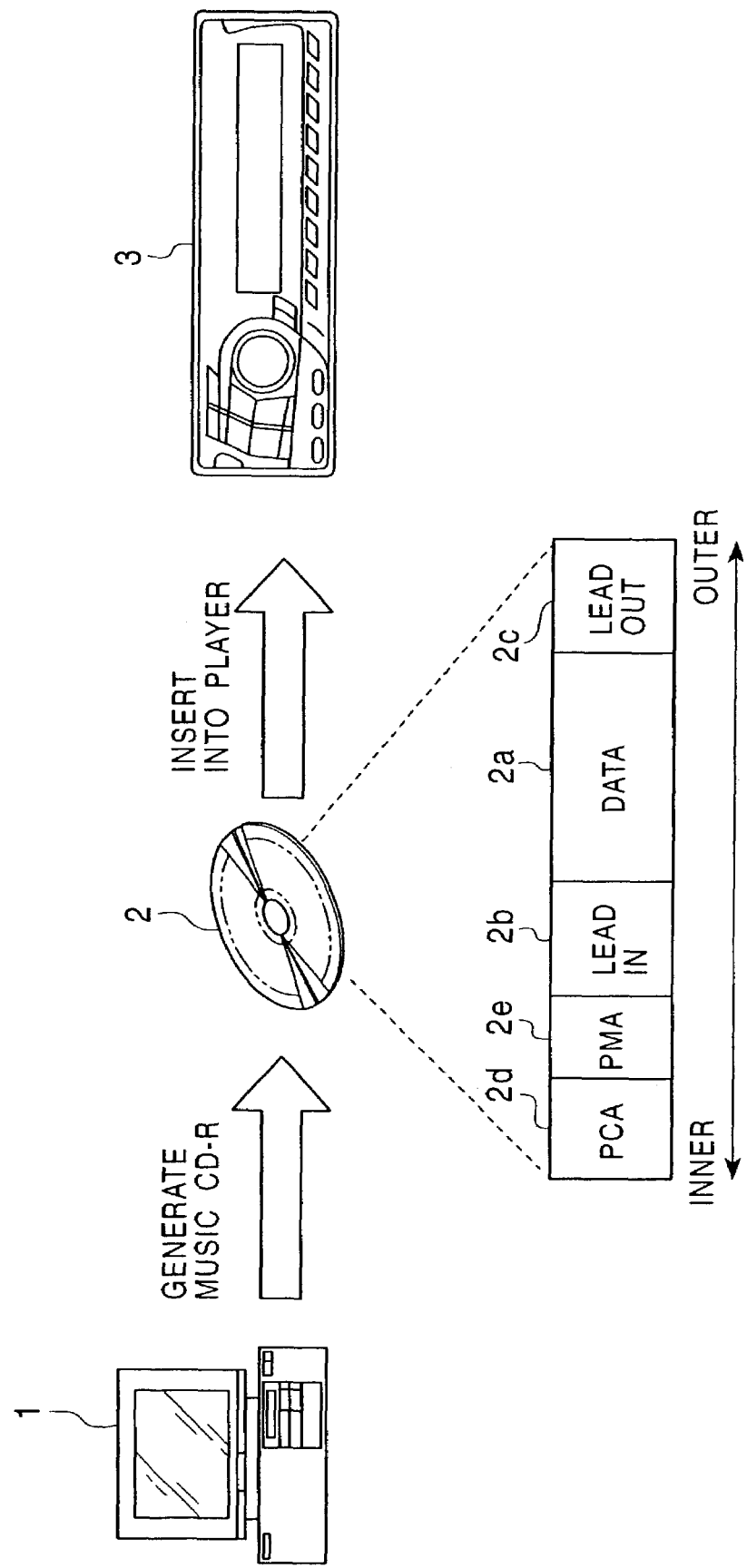

FIG. 9

| WRITING SOFTWARE | | WinCDR 6 | B'sRecorder GOLD | Nero5 | DiscJuggler PRO | PrimoCD |
|---|---|---|---|---|---|---|
| SELLING AGENCY | | Aplix | BHA | AHEAD | Landport | Easy Systems |
| AVAILABLE CHARACTER | ASCII/ISO646 | ○ | ○ | ○ | ○ | ○ |
| | ISO8859-1 | × | × | ○ | × | × |
| | MS-JIS | ○ | ○ | × | × | ○ |
| | OTHERS | — | — | — | — | — |
| | DEFAULT | MS-JIS | ASCII | ASCII | ASCII | ASCII |
| AVAILABLE LANGUAGE | GERMAN | × | × | × | × | × |
| | ENGLISH | ○ | ○ | ○ | ○ | ○ |
| | SPANISH | × | × | × | × | × |
| | FRENCH | × | × | × | × | × |
| | JAPANESE | ○ | ○ | × | × | ○ |
| | OTHERS | — | — | — | — | — |
| | DEFAULT | ENGLISH/JAPANESE | ENGLISH | ENGLISH | ENGLISH | ENGLISH/JAPANESE |

JAPANESE CAN BE INPUT WITH CHARACTER CODE ASCII/ISO646 OR ISO8859-1

JAPANESE CAN BE INPUT WITH CHARACTER CODE ASCII/ISO646 OR ISO8859-1

FIG. 12

| MNR | MAIN-FRAME NO. | POINT | PMIN, PSEC, PFRAME | |
|---|---|---|---|---|
| 00 | n | 01 | 00.02.32 | |
| ↓ | n+1 | 01 | 00.02.32 | |
|  | n+2 | 01 | 00.02.32 | |
|  | n+3 | 02 | 10.15.12 | |
|  | n+4 | 02 | 10.15.12 | |
|  | n+5 | 02 | 10.15.12 | |
|  | n+6 | 03 | 16.28.63 | |
|  | n+7 | 03 | 16.28.63 | |
|  | n+8 | 03 | 16.28.63 | |
|  | n+9 | 04 | . . | |
|  | n+10 | 04 | . . | |
|  | n+11 | 04 | . . | |
|  | n+12 | 05 | . . | |
|  | n+13 | 05 | . . | |
|  | n+14 | 05 | . . | |
|  | n+15 | 06 | 49.10.03 | |
|  | n+16 | 06 | 49.10.03 | |
|  | n+17 | 06 | 49.10.03 | |
|  | n+18 | A0 | 01.00.00 | MNR OF FIRST MUSICAL PIECE IN DISK |
|  | n+19 | A0 | 01.00.00 | |
|  | n+20 | A0 | 01.00.00 | |
|  | n+21 | A1 | 06.00.00 | MNR OF LAST MUSICAL PIECE IN DISK |
|  | n+22 | A1 | 06.00.00 | |
|  | n+23 | A1 | 06.00.00 | |
|  | n+24 | A2 | 52.48.41 | START POINT OF LEAD-OUT AREA |
|  | n+25 | A2 | 52.48.41 | |
| 00 | n+26 | A2 | 52.48.41 | |
| 00 | n+27 | 01 | 00.02.32 | REPEATED |
| ↓ | n+28 | 01 | 00.02.32 | |
|  | . | . | . . | |

FIG. 13

| MNR | MAIN-FRAME NO. | POINT | PMIN, PSEC, PFRAME | |
|---|---|---|---|---|
| 00 | n | 01 | 00.02.32 | |
| | n+1 | 01 | 00.02.32 | |
| | n+2 | 01 | 00.02.32 | |
| | n+3 | 02 | 10.15.12 | |
| | n+4 | 02 | 10.15.12 | |
| | n+5 | 02 | 10.15.12 | |
| | n+6 | 03 | 16.28.63 | |
| | n+7 | 03 | 16.28.63 | |
| | n+8 | 03 | 16.28.63 | |
| | n+9 | 04 | . . | |
| | n+10 | 04 | . . | |
| | n+11 | 04 | . . | |
| | n+12 | 05 | . . | |
| | n+13 | 05 | . . | |
| | n+14 | 05 | . . | |
| | n+15 | 06 | 49.10.03 | |
| | n+16 | 06 | 49.10.03 | |
| | n+17 | 06 | 49.10.03 | |
| | n+18 | A0 | 01.00.00 | MNR OF FIRST MUSICAL PIECE IN DISK |
| | n+19 | A0 | 01.00.00 | |
| | n+20 | A0 | 01.00.00 | |
| | n+21 | A1 | 06.00.00 | MNR OF LAST MUSICAL PIECE IN DISK |
| | n+22 | A1 | 06.00.00 | |
| | n+23 | A1 | 06.00.00 | |
| | n+24 | A2 | 52.48.41 | START POINT OF LEAD-OUT AREA |
| | n+25 | A2 | 52.48.41 | |
| | n+26 | A2 | 52.48.41 | |
| | n+27 | B0 | | |
| | n+28 | B0 | | |
| | n+29 | B0 | | |
| | n+30 | B1 | | |
| | n+31 | B1 | | |
| | n+32 | B1 | | |
| | n+33 | B2 | | |
| | n+34 | B2 | | |
| 00 | n+35 | B2 | | |
| 00 | | 01 | 00.02.32 | REPEATED |
| | | 01 | 00.02.32 | |
| | | . | . . | |
| | | . | . . | |

FIG. 14
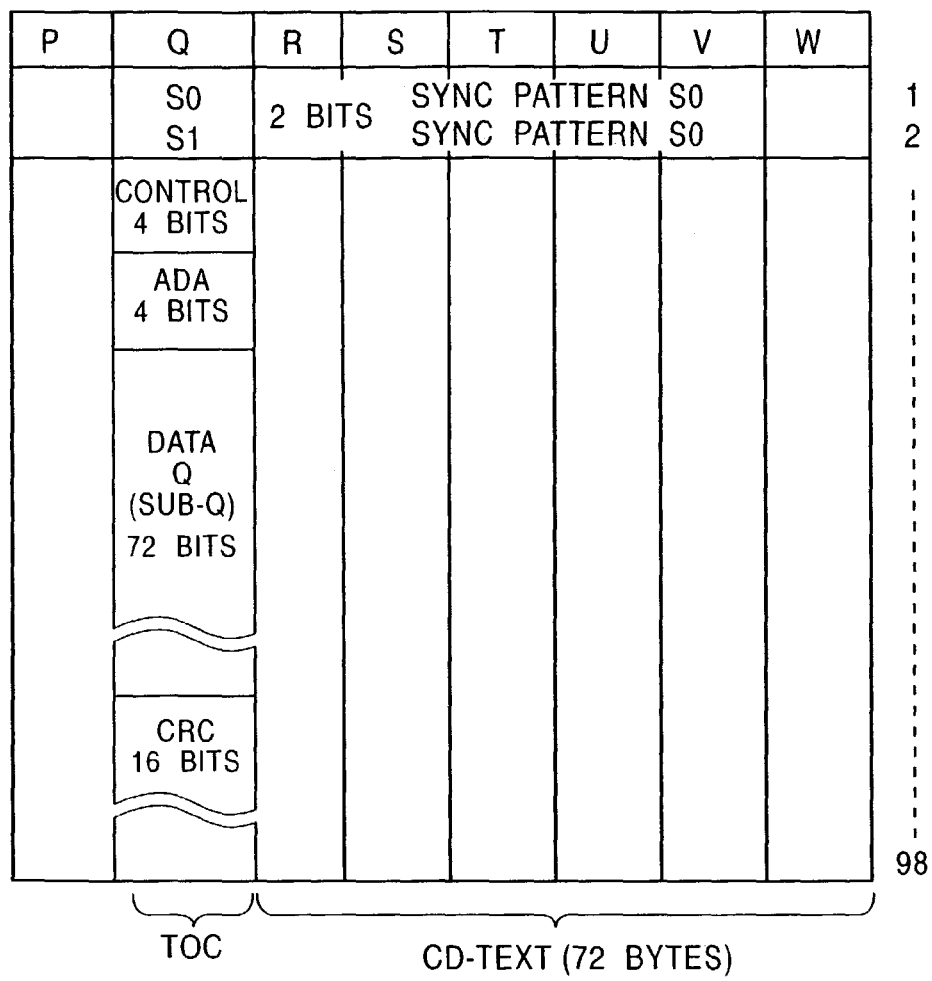
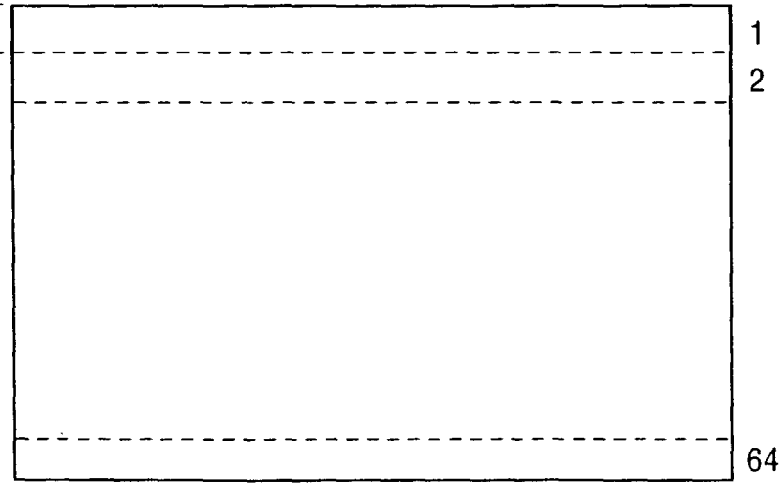

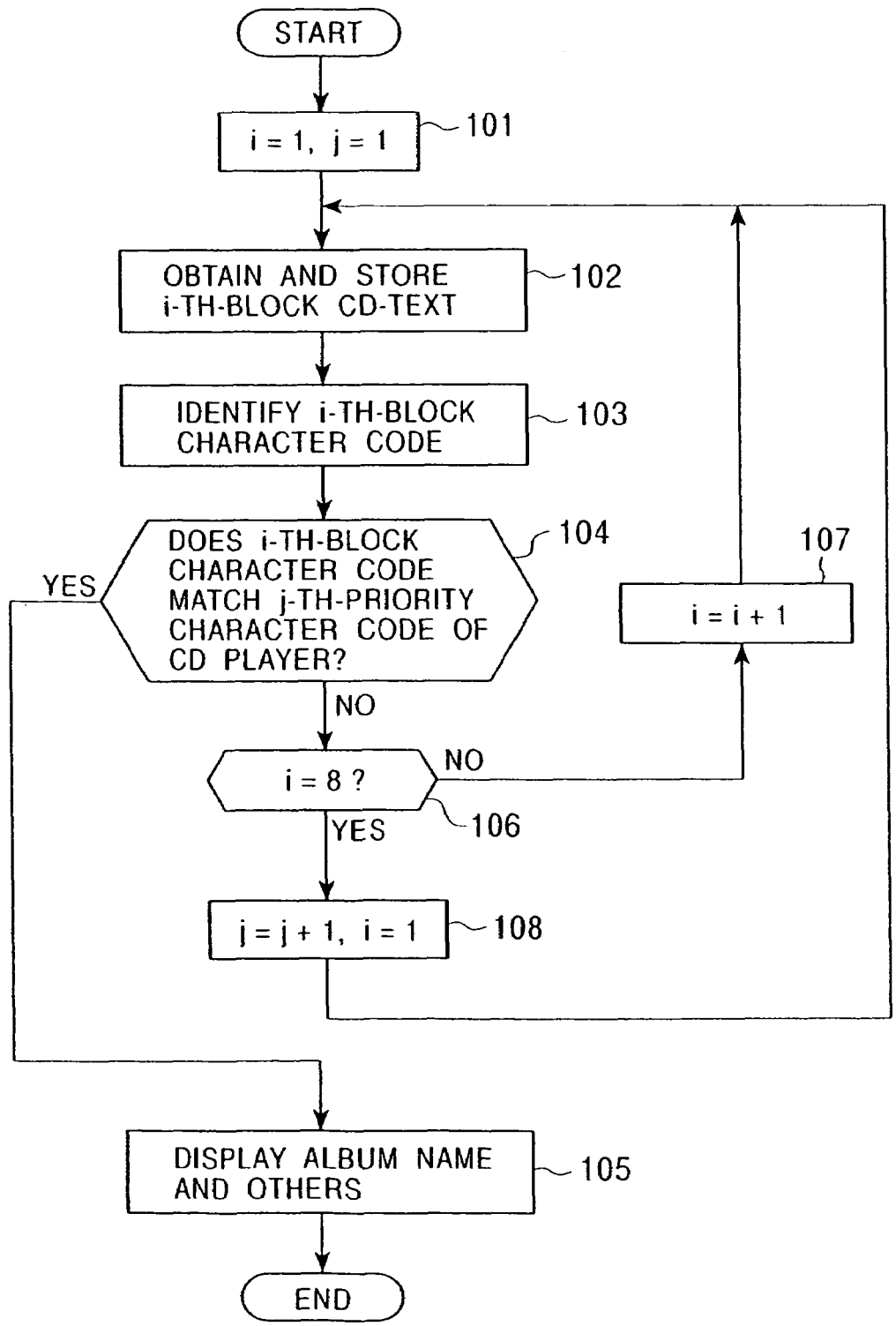

DISC PLAYER AND RECORDER-CONTENT INFORMATION DISPLAY METHOD FOR THE SAME

BACKGROUND OF THE INVENTION

1. Field of the Invention

The present invention relates to disc players and recorded-content information display methods therefor, and more particularly, to a disc player which reads from a disc having a first area for recording musical data and a second area for recording information related to the content of what is recorded in the first area, this information being called first-area recorded-content information, and displays the first-area recorded-content information on a display section in a designated language, and recorded-content information display methods therefor.

2. Description of the Related Art

Discs have been used which are provided with a first area for recording musical data and a second area for recording information (first-area recorded-content information) related to the content of what is recorded in the first area and in which the first-area recorded-content information is recorded in each of a plurality of blocks provided for the second area by a different combination of a character code and a language code. Such discs include CD-Rs, which are optical discs for which writing is allowed only once.

Since CD-Rs can record data, musical data is recorded in them and played back. More specifically, as shown in FIG. 8, a personal computer 1 is used to read desired musical data from a CD or other source and to record the data in a CD-R 2, or to record musical data received through a network in the CD-R 2, and the musical data is played back by a CD player 3. It is possible that management information, such as an album name, the title names of musical pieces, and artist names, is recorded in a lead-in area of the CD-R 2 as CD-TEXT when musical data is recorded in the CD-R 2, and the information is displayed on a display section of the CD player, if necessary, during playback. The CD-TEXT includes the following types of information.

(1) Name of an album or a track title (musical piece)
(2) Name of a performer (singer, player, conductor, orchestra, etc.)
(3) Name of a songwriter
(4) Name of a composer
(5) Name of an arranger
(6) Message from production/sponsor site or artist
(8) Disc identification information
(9) Genre identification information
(10) TOC information
(11) Second TOC information
(11) Album UPC/EAN code or ISRC code of each track
(12) Block-information size and character-code/language-code information The CD-TEXT is recorded in the lead-in area in units of blocks, each block corresponding to a different combination of a language code and a character code. More specifically, the lead-in area of the CD-R 2 has eight blocks, and the foregoing pieces (1) to (12) of CD-TEXT information are continuously recorded in each block for a different combination of a language code and a character code. One block has the maximum size of 4,608 bytes (corresponding to about 0.9 seconds), including CRC information.

Various types of writing software are commercially available for recording musical data by the personal computer 1, as shown in FIG. 9, and still more various types of software will be become available in the future. For example, WinCDR handles both English and Japanese, and uses character codes of ASCII/ISO646 and MS-JIS. With WinCDR, the foregoing pieces (1) to (12) of CD-TEXT information are generated in English and in Japanese at the same time and recorded in different blocks. Nero5 handles English only, and uses character codes of ASCII/ISO646 and ISO8859-1. CD-TEXT information is recorded in a predetermined block by a selected character code. The writing software shown in the figure only handles English, Japanese, or both, and does not handle other languages. In the future, however, various additional software will become available and it will be possible that CD-TEXT information is recorded in each block by a different combination of a language code and a character code.

As shown in FIG. 8, the CD-R 2 is provided with a program area 2a for recording musical data, a lead-in area 2b for recording TOC information and CD-TEXT, and a lead-out area 2c, like usual CDs. Unlike CDs, the CD-R 2 includes a power calibration area 2d and a program memory area 2e. The power calibration area 2d records the intensity of a laser used for recording musical data, for each musical piece. The program area 2e saves the top address and the last address of a track (musical piece). Whether a disc is a CD-R can be determined by whether the power calibration area 2d or the program memory area 2e is provided or not.

FIG. 10(a) to FIG. 10(c) show a signal format used in CDs and CD-Rs. An acoustic signal has six samples (one sample has 16 bits) for each of L and R channels. The total of 12 samples are divided by eight bits to make 24 symbols, each symbol having eight bits. An error code (CIRC) having 24 symbols is added to the 24 symbols to form one unit having 32 symbols. A frame synchronization signal and a sub-code are added to this unit having 32 symbols to form one frame (shown in FIG. 10(a) and FIG. 10(b)). The sub-code having eight bits and each symbol are EFM-modulated to each have 14 bits, and the frame synchronization signal has 24 bits. In addition, three coupling bits are inserted between symbols. Therefore, one frame actually has 588 bits.

One main frame is formed of 98 frames (shown in FIG. 10(a)). The sub-code is formed of P, Q, R, S, T, U, V, and W, each having one bit in one frame as shown in FIG. 10(c). Sub-codes for the first two frames are synchronization signals S0 and S1 in the main frame, where S0=00100000000001 and S1=0000000010010. Each of P, Q, R, S, T, U, V, and W has 98 bits in the main frame. As shown in FIG. 11, sub-code Q is formed of two-bit synchronization data, four-bit control data, four-bit address data, 72-bit data, and 16-bit CRC data. A data format differs between the lead-in area and the program area. In FIG. 11, (1) shows the data format of TOC in the lead-in area, and (2) shows a data format in the program area. MNR indicates a musical-piece number (also called a track number), and ranges from 00 to 99. In the lead-in area, MNR is always 00. In the program area, MNR ranges from 01 to 99. X indicates a chapter number used only in the program area, and ranges from 00 to 99 for each musical-piece number. MIN, SEC, and FRAME indicate an elapsed time from the top of the musical piece to the current position by minute, second, and frame, respectively. ZERO indicates all zeros. AMIN, ASEC, and AFRAME indicate an absolute time from the top of the program area to the current absolute position by minute, second, and frame, respectively. POINT indicates the number (track number) of the musical piece when TOC indicates the top position of the musical piece. PMIN, PSEC, and PFRAME indicate an absolute position time from the top of the program area to the top position of the musical piece by minute, second, and frame, respectively, and corresponds to the table of contents of the disc.

FIG. 12 is a view showing TOC in the lead-in area of a CD. The top position of each musical piece is repeatedly (three times) recorded at portions where MNR=00. For example, sub-code Q indicates 00 minutes, two seconds, and 32 frames as the top position of musical piece 01 in main frames No. n, No. (n+1), and No. (n+2). In addition, the first musical piece in the disc is indicated at POINT=A0, the last musical piece in the disc is indicated at POINT=A1, and the top position of the lead-out area is indicated at POINT=A2. The figure shows a case in which the disc includes six musical pieces. As shown in FIG. 13, sub-code Q in the lead-in area of a CD-R records TOC information in the same way as for a CD, but further records predetermined information at POINT=B0, POINT=B1, and POINT=B2 in a different manner from that for a CD. Therefore, whether a disc is a CD-R or a CD can be determined by whether there are POINT=B0, POINT=B1, and POINT=B2.

In a CD, sub-code, R, S, T, U, V, and W are used to record still-picture information (line graphic, TV graphic). In a CD-R, the user can record CD-TEXT in a desired way by using sub-code, R, S, T, U, V, and W, as shown in FIG. 14. Since the area of sub-code, R, S, T, U, V, and W has 72 bytes (six bits×96 frames/eight bits) in a main frame (98 frames), the area can have the maximum-size block (4,608 bytes) in 64 main frames. The lead-in area of a CD-R has eight blocks, block 0 to block 7, as shown in FIG. 15. Each block has 80H to 8FH (H indicates hexadecimal) areas. The 80H area records an album name or a track title name, the 81H area records the name of a performer (singer, player, etc.) for each track, the 82H to 8EH areas record predetermined information, and the 8FH area records a block size, a character code, and a language code in the block.

As described above, blocks in a CD-R record an album name or a track title name, the name of a songwriter, the name of a composer, the name of an arranger, and a message from a production/sponsor site or from an artist, by a different combination of a character code and a language code. It is rare that a commercially-available CD handles CD-TEXT, but it has become common that the users write CD-TEXT in CD-Rs by using general-purpose PCs or other units.

Therefore, when the disc player reads CD-TEXT from a CD-R and displays it, the disc player needs to check a language code and a character code in each block, and to read CD-TEXT information from a corresponding block. When the disc player allows full-dot display, for example, since two-byte character code (MS-JIS) can be displayed, the disc player first checks whether the two-byte character code (MS-JIS) has been recorded; when recorded, the disc player obtains it and then displays an album name and other information in Japanese; and when not recorded, the disc player obtains one-byte character-code (such as ASCII or ISO8859-1) information and displays the album name and other information in English. It is troublesome to take two steps.

FIG. 16 is a flowchart of conventional CD-TEXT information acquisition processing. By system settings, a first-priority character code and a second-priority character code have been determined. When a full-dot display is allowed, as described above, for example, the first-priority character code is set to MS-JIS, and the second-priority character code is set to ASCII or ISO8859-1.

Both "i" and "j" are set to one (in step 101), and CD-TEXT information of an i-th block is read and stored (in step 102). Then, a character code is identified from the CD-TEXT information of the i-th block (in step 103). Whether the character code matches the j-th-priority character code is determined (in step 104). When they match, an album name and other information recorded in the i-th block are displayed by the character code (in step 105). When the character code of the i-th block does not match the j-th-priority character code in step 104, whether "i" is eight, that is, whether a character-code comparison process has been finished for all blocks, is determined (in step 106). When a negative result is obtained, "i" is incremented by one (i=i+1, in step 107), and the processes of step 102 and subsequent steps are repeated. When it is determined that "i" is eight, namely, that the character-code comparison process has been finished for all blocks, "j" is incremented by one (j=j+1) and "i" is set to one (in step 108), and the processes of step 102 and subsequent steps are performed for the next-priority character code.

As described above, conventionally, CD-TEXT information needs to be read from each block to compare the character code until a desired character code is found. It takes a long time. To check a character code, it is necessary to read information in the 8FH area from each block. When a maximum of eight blocks are recorded, it takes about 7.2 seconds to read the information. In the above-described conventional processing, it takes several seconds to several tens of seconds to display information required for the above-described processing. In general, the user has a tendency to use only MS-JIS or ASCII in writing. Irrespective of this, because a CD player searches for the best information, it takes a long time to display predetermined information.

SUMMARY OF THE INVENTION

Accordingly, it is an object of the present invention to allow CD-TEXT information to be displayed within a short period in a designated language.

Another object of the present invention is to accumulate data indicating a tendency related to CD-TEXT generation to allow CD-TEXT information to be displayed within a short period in a designated language.

The foregoing objects are achieved in one aspect of the present invention through the provision of a recorded-content information display method for a disc player in which a disc is mounted which is provided with a first area for recording musical data and a second area for recording information related to the content of what is recorded in the first area, this information being called first-area recorded-content information, and in which the first-area recorded-content information is recorded in each of a plurality of blocks provided for the second area by a different combination of a character code and a language code, the recorded-content information display method being for reading the first-area recorded-content information from a designated block of the second area and for displaying it in a designated language on a display section, the recorded-content information display method including the acts of: recording in each block a character code of the block and a language code of each of all blocks in addition to the first-area recorded-content information; when the first-area recorded-content information of a designated block is read and displayed, counting and saving a read count corresponding to the language code of the block; and when a new disc is played back, reading first-area recorded-content information from a block having a language code which has the maximum read count, and displaying it in a language corresponding to the language code.

The foregoing objects are achieved in another aspect of the present invention through the provision of a disc player capable of accepting a disc which is provided with a first area for recording musical data and a second area for recording information related to the content of what is recorded in the first area, this information being called first-area recorded-content information, and in which the first-area recorded-content information is recorded in each of a plurality of blocks provided for the second area by a different combination of a character code and a language code, for reading the first-area recorded-content information from a designated block in the disc and for displaying it in a designated language, the disc player including a reading section for reading the first-area recorded-content information from the predetermined block; a display section for displaying the read first-area recorded-content information in the designated language; counting means for counting and saving a read count corresponding to the language when the first-area recorded-content information is displayed in the designated language; and a control section for, when a new disc is loaded, determining whether the disc has a block in which first-area recorded-content information has been recorded by a language which has the maximum read count, and, if the block exists, for reading the first-area recorded-content information from the block and displaying it in the language on the display section.

According to the present invention, with the above-described processing, since many CD-Rs recorded by the user are played back, the count of the language corresponding to the character code which the user uses to write CD-TEXT in CD-Rs increases, and when a new disc is loaded, CD-TEXT information can be displayed within a short period by the language. In other words, data indicating the tendency of the user for CD-TEXT generation is accumulated, and CD-TEXT information is displayed within a short period by a designated language.

In addition, according to the present invention, whether a loaded disc is a CD-R is checked, and display processing is executed for the first-area recorded-content information only when the disc is a CD-R.

According to the present invention, since CD-TEXT information is displayed by a language code having a high read count when the total of read counts is larger than a specified value, the CD-TEXT information is displayed in the language the user desires, and the time required for displaying is reduced.

According to the present invention, the current sequence number and the top sequence number of a target block are used to place a pickup at the top of the target block within a short period to read and display CD-TEXT information.

BRIEF DESCRIPTION OF THE DRAWINGS

FIG. 2 is a view showing the structure of a pack.

FIG. 4 is a view showing the structure of an 8FH area in a block.

FIG. 8 illustrates the recording and playback of a CD-R.

FIG. 9 lists writing software for recording musical data.

FIG. 12 illustrates TOC information in CDs.

FIG. 13 illustrates TOC information in CD-Rs.

FIG. 14 illustrates a CD-TEXT zone in a lead-in area.

FIG. 16 is a flowchart of conventional CD-TEXT-information acquisition processing.

DESCRIPTION OF THE PREFERRED EMBODIMENTS (A) Structure

Figure 1:
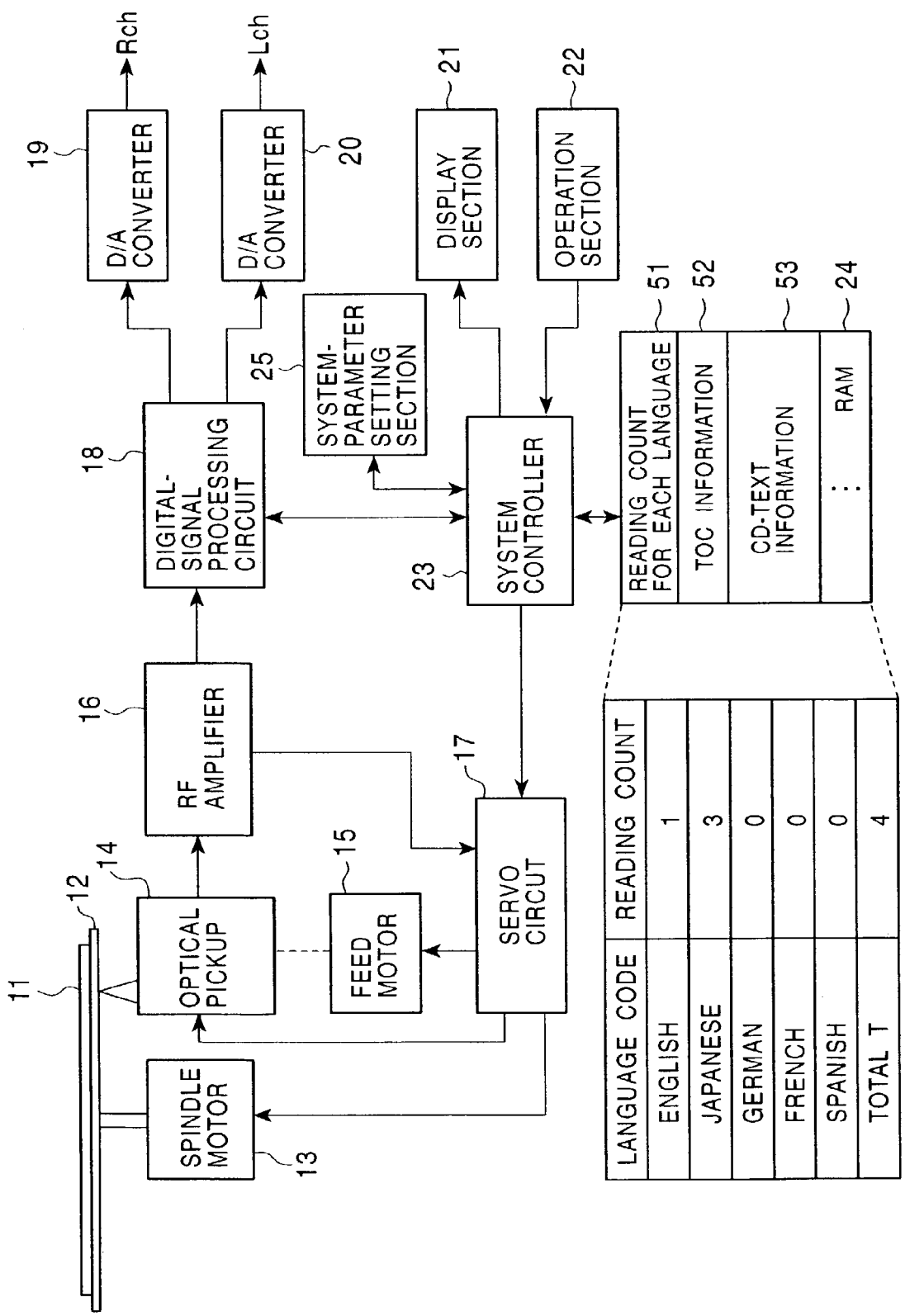
FIG. 1 is a block diagram of a disc player according to the present invention.

FIG. 1 is a block diagram of a disc player according to the present invention. There are shown a disc 11, such as a CD or a CD-R, a turntable 12 on which the disc is placed, a spindle motor 13 for rotating the disc 11 at a predetermined constant linear velocity, an optical pickup 14 for detecting a digital recording signal in the disc 11, and a feed motor 15 for feeding the optical pickup 14 in a disc radius direction.

There are also shown an RF amplifier 16 for generating an EFM signal, error signals, a CLV control signal, and others from a signal detected by the optical pickup 14, and a servo circuit 17 for applying predetermined servo according to an instruction sent from a system controller, described later, by using error signals (focus error signal and tracking error signal), the CLV control signal, and others. The servo circuit 17 also performs a track jump, which moves an objective lens (not shown) of the optical pickup 14 in units of tracks, and controls the feed motor 15 to feed the entire optical pickup 14 in the disc radius direction. A digital-signal processing circuit 18 applies synchronization, de-interleaving, error correction, sub-code extraction and other processes to the EFM signal output from the RF amplifier 16 to demodulate audio sample data, TOC information, and sub-code data.

D/A converters 19 and 20 apply D/A conversion to audio sample data output from the digital-signal processing circuit 18 separately for channels and output. There are also shown a display section 21 for displaying CD-TEXT information, the number of a musical piece being played, a playing elapsed time, and other information, an operation section 22 having various keys, the system controller 23 for controlling the display of the CD-TEXT information and the play control of the disc, and a RAM 24. The RAM 24 stores a table 51 having a read count for each language, the TOC information 52, and the CD-TEXT information 53. A system-parameter setting section 25 specifies whether the display section can display a full-dot picture or not, and other information.

(B) Block structure of a CD-R

Figure 15:
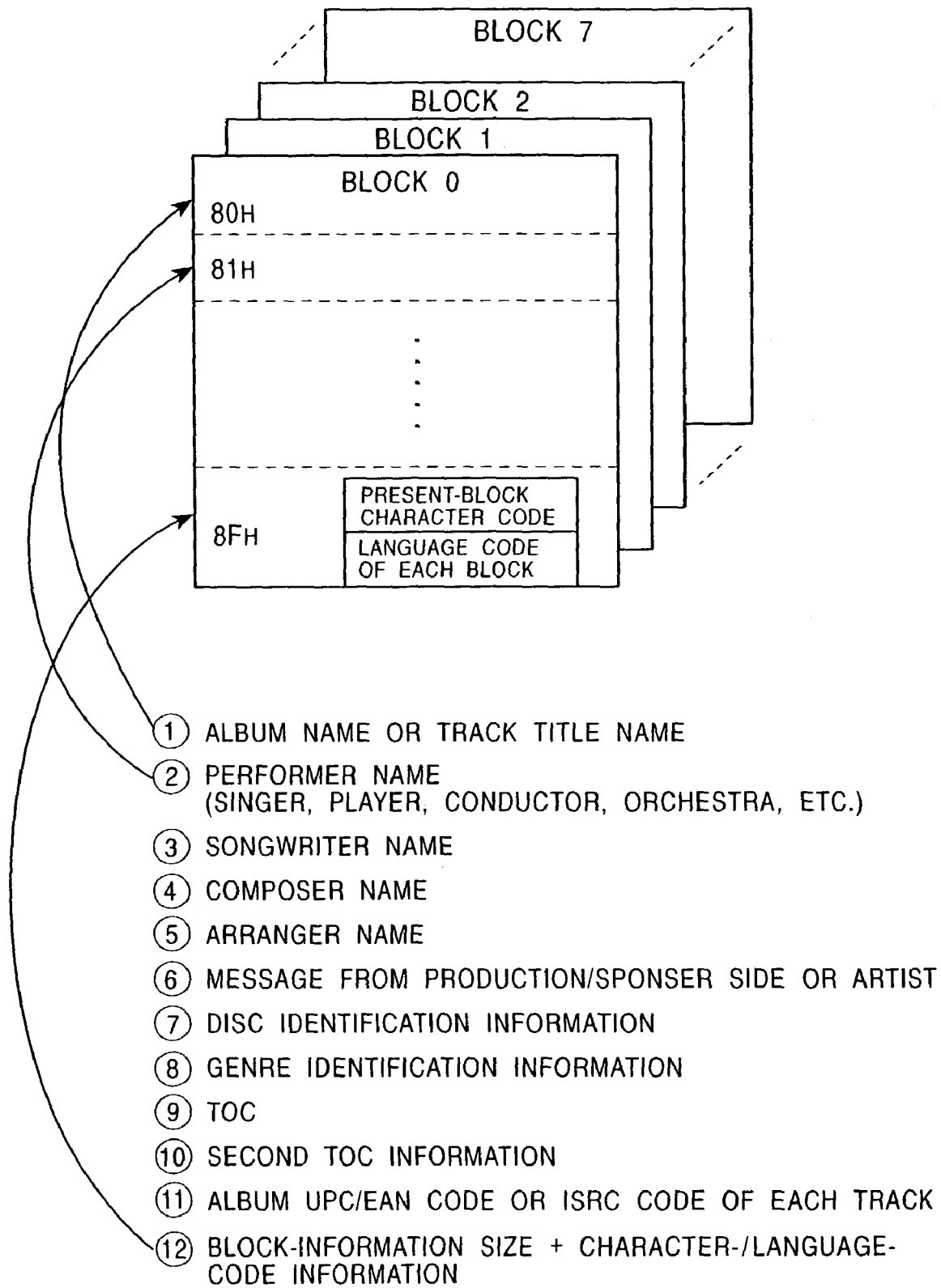
FIG. 15 is a structural view of the CD-TEXT zone.

As shown in FIG. 15, the lead-in area of a CD-R has eight blocks, block 0 to block 7. Each block has areas 80H to 8FH, where H indicates hexadecimal numbers. The 80H area records the album name or a track title name, the 81H area stores the name of a performer (singer, player, etc.) for each track, the 82H to 8EH areas record predetermined information, and the 8FH area records a block size, a character code, and a language code of the block.

One block has the maximum size of 4,608 bytes, and is formed of up to 256 packs, each pack having 18 bytes. Of the 18 bytes in one pack, two bytes are for CRC checking, and the other 16 bytes have a structure shown in FIG. 2. More specifically, one pack is formed of ID1 to ID4, four bytes, TEXT1 to TEXT12, 12 bytes, and a CRC, two bytes.

Figure 3:
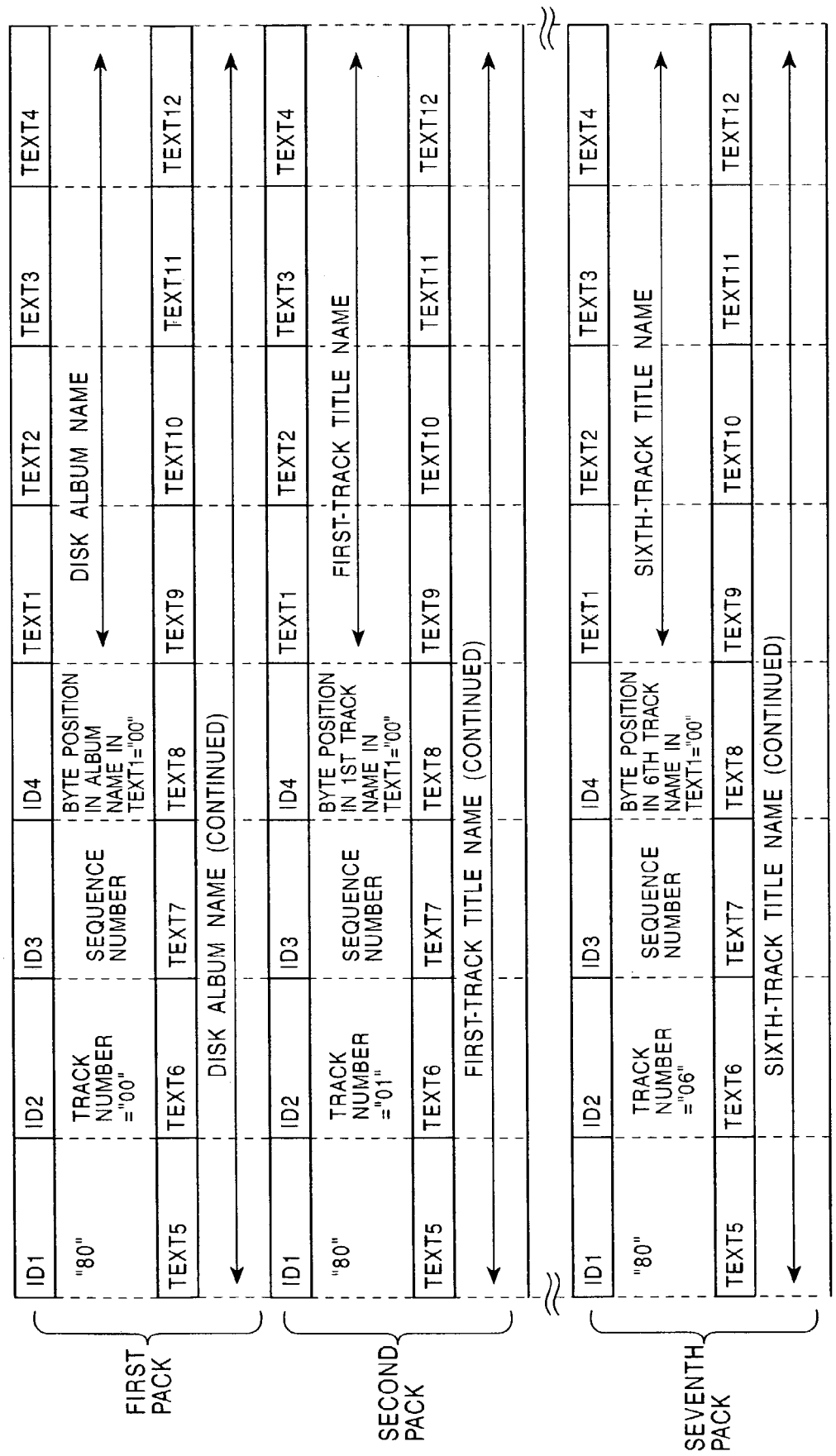
FIG. 3 is a view showing the structure of an 80H area in a block.

The 80H area of each block records the album name or the name of a title in each track. For example, when a CD-R records six tracks, and each track can be expressed by one pack, one pack is used for the album name, and six packs are used for tracks, as shown in FIG. 3. The total of seven packs record the album name and the title name of each track. In the 80H area, ID1 has "80," ID2 indicates a track number ("00" indicates the disc), ID3 indicates a sequence number in each block, ID4 indicates a character position in the title name shown in TEXT1, TEXT1 to TEXT12 are expressed by the character code. Since ASCII/ISO646 is a one-byte character code, one pack can express 12 characters. Since MS-JIS is a two-byte character code, one pack can express six characters. CD-TEXT information is recorded in the other areas of each block in the same way as in the 80H area.

Figure 5:
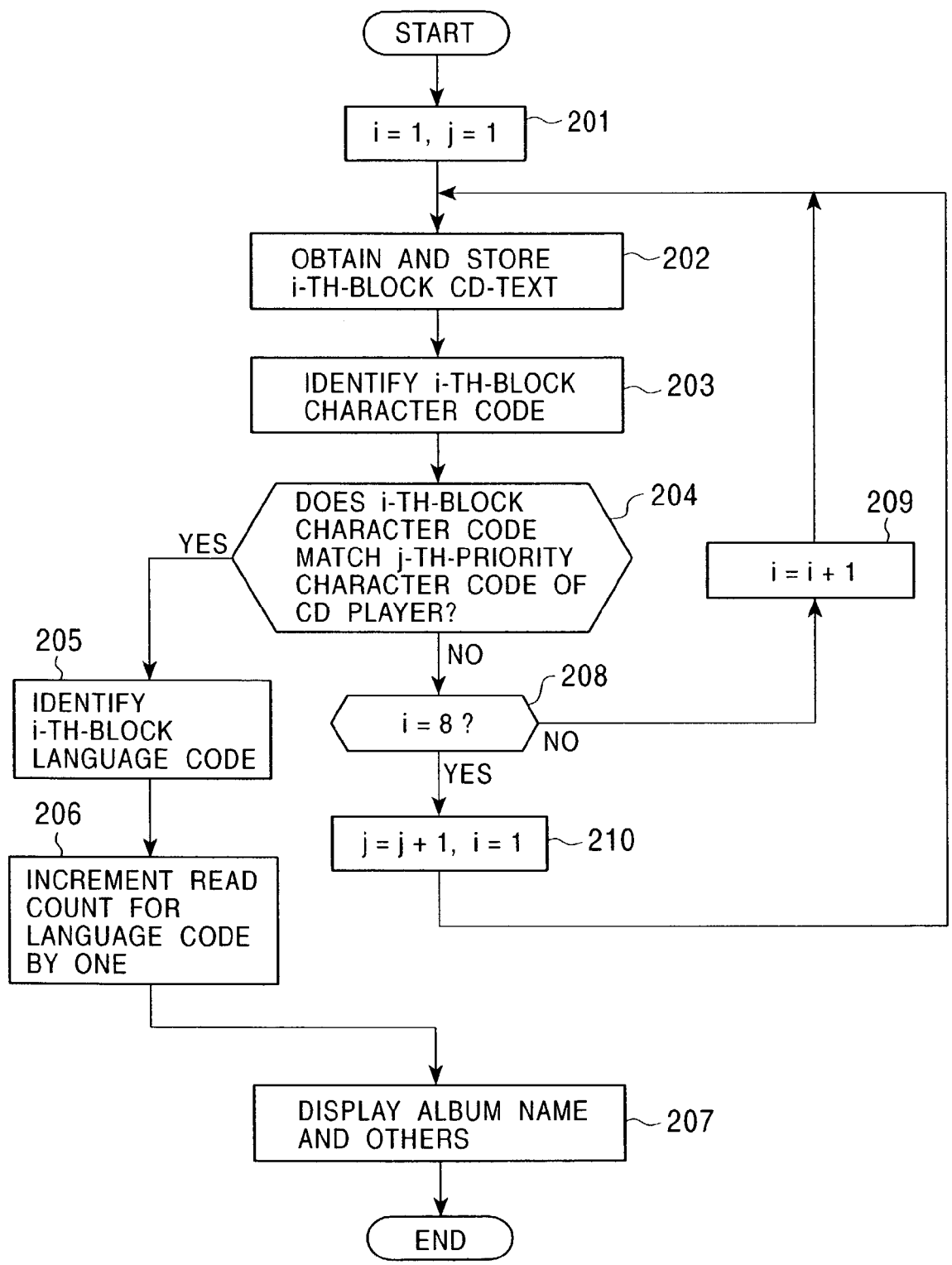
FIG. 5 is a flowchart of CD-TEXT display processing used when the total of read counts is equal to or smaller than a specified value.

The 8FH area of each block is formed of three packs, as shown in FIG. 4. In each pack, ID1 has "8F," ID2 indicates a pack number, ID3 indicates a sequence number, and ID4 indicates a block number. TEXT1 to TEXT12 in the first to third packs record:
1. Character code of the present block
2. First track number
3. Last track number
4. Copy protection information
5. Number of packs in the 80 to 8F areas
6. Last sequence number of each block (size of each block)
7. Language code of each block (C) Initial CD-TEXT display processing flow FIG. 5 is a flowchart of CD-TEXT display processing used when the total of the read counts is equal to or less than a specified value. The system controller 23 recognizes a first-priority character code and a second-priority character code by settings in the system-parameter setting section 25. When a full-dot display is allowed, for example, the first-priority character code is set to MS-JIS, and the second-priority character code is set to ASCII or ISO8859-1.

When a CD-R is mounted, the system controller 23 initializes "i" and "j" both to one (in step 201), and reads the CD-TEXT information of an i-th block and stores it in the RAM 24 (in step 202). Then, the system controller 23 identifies the character code recorded in the 8FH area of the i-th block (in step 203), and determines whether the character code matches the j-th-priority character code (in step 204). When they match, the system controller 23 identifies the language code of the i-th block, recorded in the 8FH area (in step 205), and increments the read count corresponding to the language code, stored in the RAM 24 by one and the total T of read counts by one (in step 206). Then, the system controller 23 displays the album name and other information recorded in the i-th block on the display section 21 (in step 207).

When the character code of the i-th block does not match the j-th-priority character code in step 204, the system controller 23 determines (in step 208) whether "i" is eight, that is, whether a character-code comparison process has been finished for all blocks. When a negative result is obtained, the system controller increments "i" by one (i=i+1, in step 209), and the processes of step 202 and subsequent steps are repeated. When it is determined that "i" is eight, namely, that the character-code comparison process has been finished for all blocks, the system controller 23 increments "j" by one (j=j+1) and sets "i" to one (in step 210), and the processes of step 202 and subsequent steps are performed for the next-priority character code.

Figure 6:
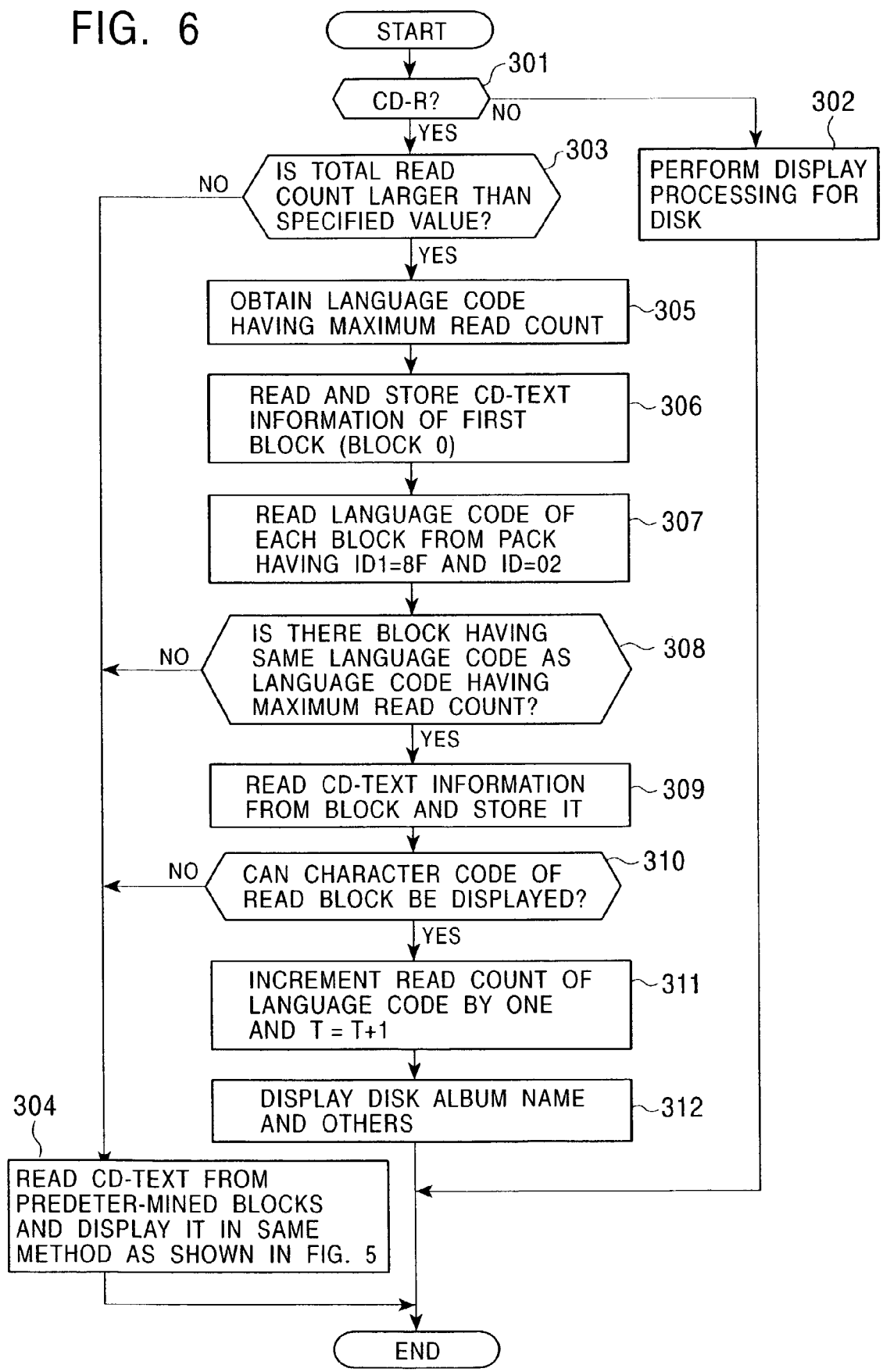
FIG. 6 is a flowchart of CD-TEXT display processing used when the total of read counts is larger than the specified value.

FIG. 6 is a flowchart of CD-TEXT display processing used when the total of the read counts is larger than the specified value.

When a disc is mounted on the CD player, the system controller 23 determines whether the disc is a CD-R (in step 301). If the disc is not a CD-R, the system controller 23 performs a display process for the disc (in step 302). When the disc is a CD-R, the system controller 23 determines whether the total T of the read counts is equal to or larger than the specified value (in step 303). If the total T is smaller than the specified value, the system controller displays CD-TEXT information in the method shown in FIG. 5.

When the total T of read counts is equal to or larger than the specified value in step 301, the system controller 23 obtains the language code having the maximum read count from the table 51 having a read count for each language, stored in the RAM 24 (in step 305).

Then, the system controller 23 reads the CD-TEXT information of block 0 (in step 306), and, reads the language code of each block from the pack having ID1=8F and ID2=02 (in step 307).

The system controller 23 determines whether there is a block having the same language code as that having the maximum read count (in step 308). When there is not such a block, the system controller 23 displays CD-TEXT information by the method shown in FIG. 5 in step 304. When there is a block having the same language code as that having the maximum read count, the system controller 23 reads the CD-TEXT information of the block, and stores it in the RAM 24 (in step 309).

Next, the system controller 23 determines (in step 310) whether the character code of the read block can be analyzed, that is, whether a character string expressed by the character code can be displayed on the display section. If it cannot be displayed, the system controller 23 displays CD-TEXT information by the method shown in FIG. 5. When it can be displayed, the system controller 23 increments the read count of the language code by one and the total T of the read counts by one (in step 311). Then, the system controller 23 displays the disc album name and other information (in step 312).

With the above-described processing, since many CD-Rs recorded by the user are played back, the count of the language corresponding to the character code which the user uses to write CD-TEXT in CD-Rs increases, and when a new disc is loaded, CD-TEXT information can be displayed within a short period by the language. In other words, data indicating the tendency of the user for CD-TEXT generation is accumulated, and CD-TEXT information is displayed within a short period by a designated language. In addition, since whether a loaded disc is a CD-R is checked, the CD-TEXT-information display processing is executed only when the disc is a CD-R.

Figure 7:
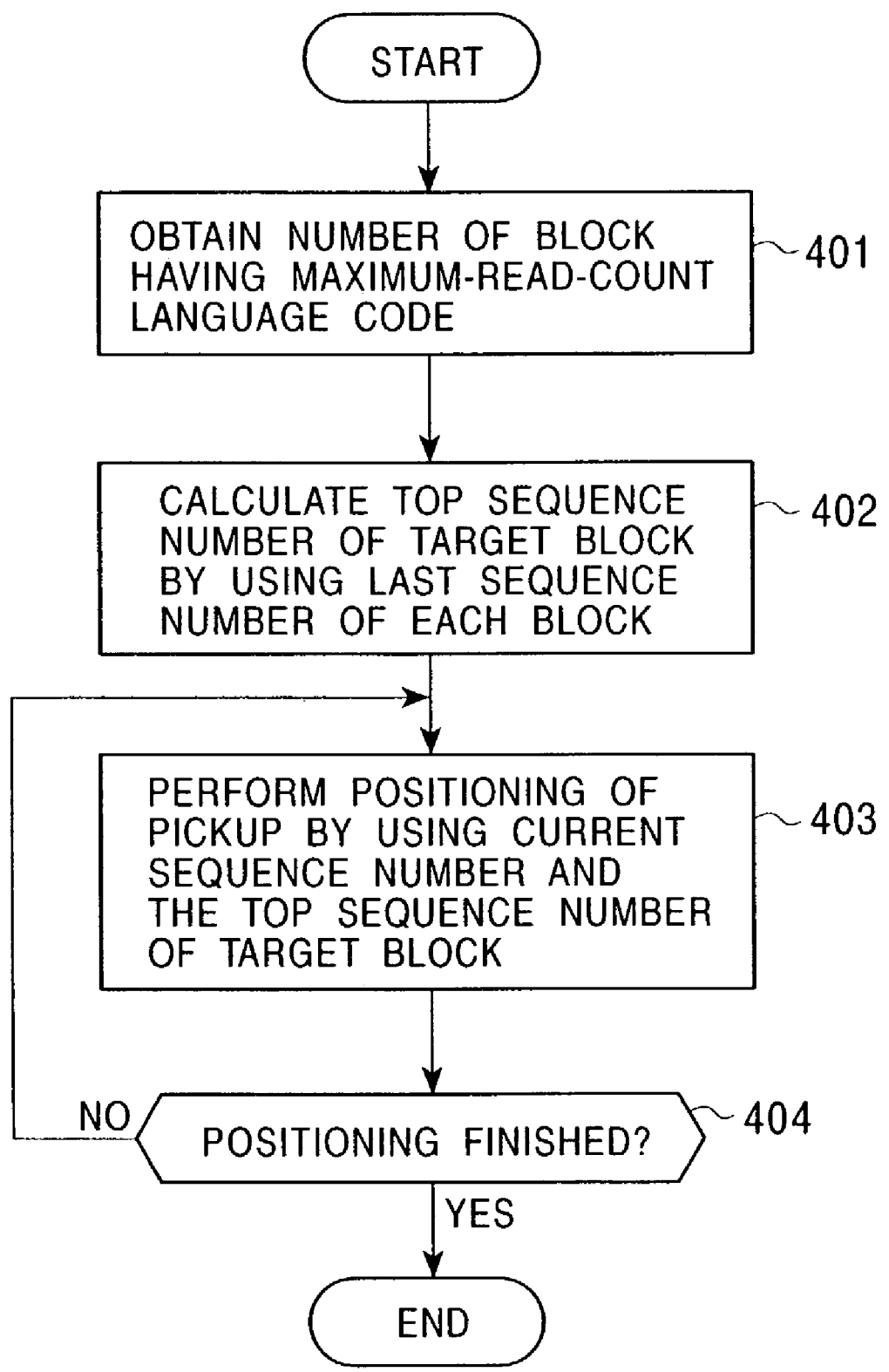
FIG. 7 is a flowchart of positioning processing for placing a pickup at a target block.
Figure 10:
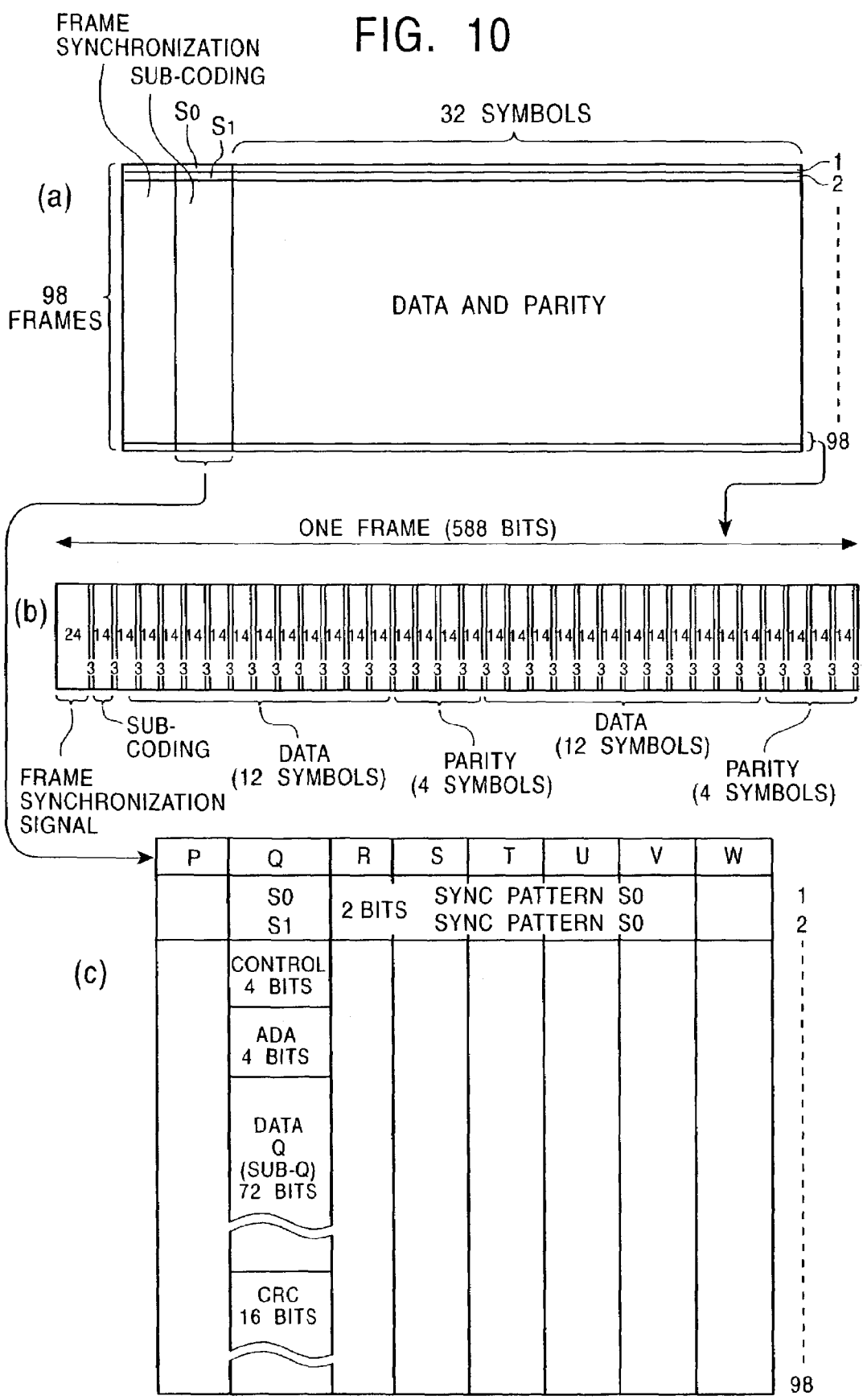
FIG. 10 illustrates a signal format used for CDs and CD-Rs.
Figure 11:
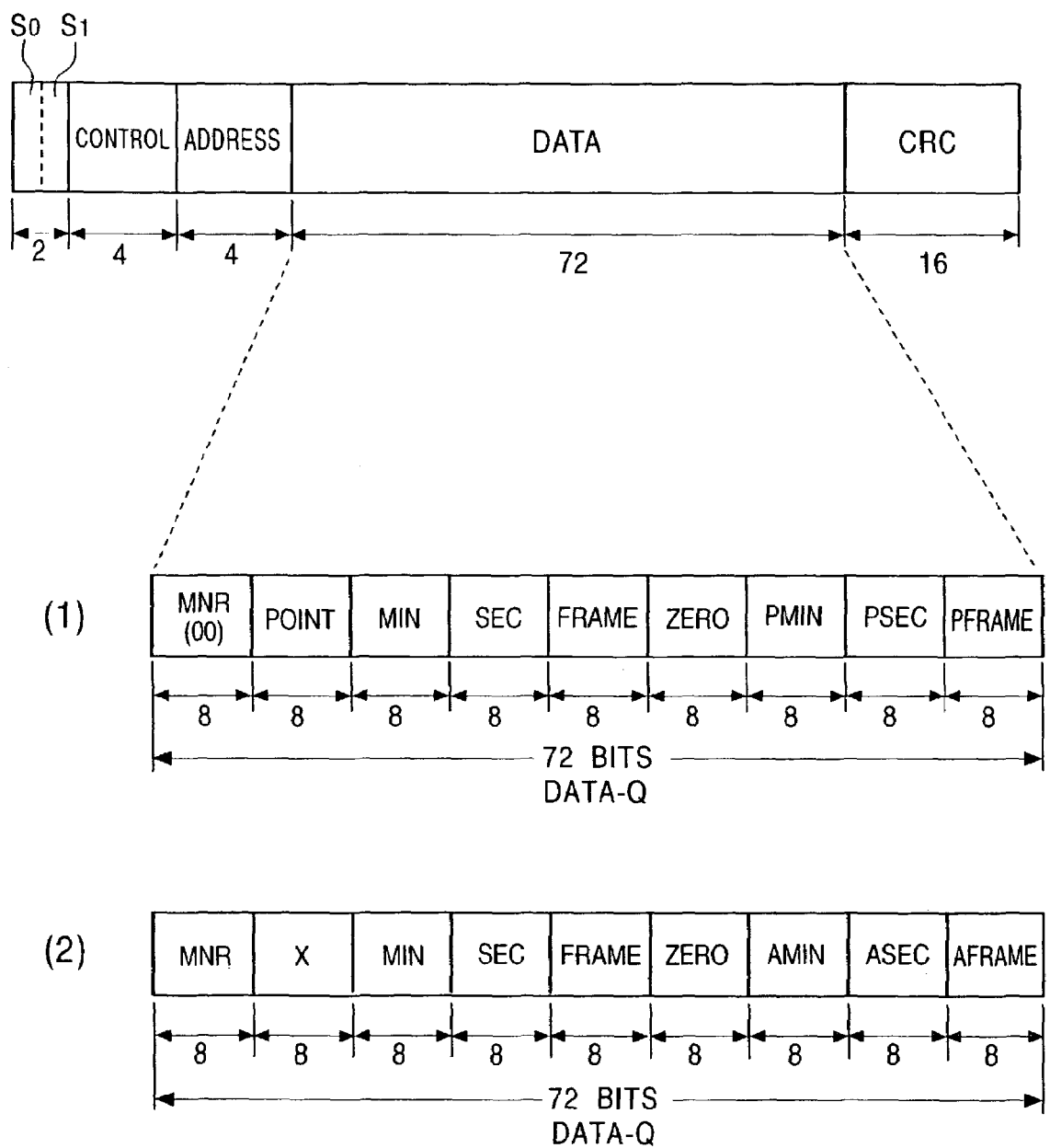
FIG. 11 illustrates sub-code Q information.

FIG. 7 is a flowchart of positioning processing for placing the pickup at a block having the same language code as that having the maximum read count.

When it is determined in step 308 of FIG. 6 that there is a block having the same language code as that having the maximum read count, the system controller 23 obtains the number of the block (target block, in step 401). Then, the system controller 23 calculates the top sequence number of the target block (in step 402) by using a necessary number among the last sequence number (size) of each block (step 402), stored in the area having ID1=8F. The system controller 23 provides the current sequence number and the top sequence number to the servo circuit 17, and the servo circuit 17 uses the sequence numbers to control the feed motor 15 such that the pickup is placed at the top sequence position of the target block (steps 403, 404).

With the above operations, the current sequence number and the top sequence number of the target block are used to place the pickup at the top of the target block within a short period to read CD-TEXT information.

What is claimed is:

1. A recorded-content information display method for a disc player in which is mounted a disc which is provided with a first area for recording musical data and a second area for recording information related to the content of what is recorded in the first area, this information being called first-area recorded-content information, and in which the first-area recorded-content information is recorded in each of a plurality of blocks provided for the second area by a different combination of a character code and a language code, the recorded-content information display method being for reading the first-area recorded-content information from a designated block of the second area and for displaying it in a designated language on a display section, the recorded-content information display method comprising:

recording in each block a character code of the block and a language code of all blocks in addition to the first-area recorded-content information;

when the first-area recorded-content information of a designated block is read and displayed, counting and saving a read count corresponding to the language code of the block; and when a new disc is played, reading first-area recorded-content information from a block having a language code which has the maximum read count, this language code being called a maximum-count language code, and displaying it in a language corresponding to the language code;

wherein, when the total of the read counts corresponding to language codes is larger than a specified value, the first-area recorded-content information is read from the block having the maximum-count language code and displayed, and when the total is equal to or smaller than the specified value, a character code is sequentially read from each block; it is determined whether the character code matches a first-priority character code determined by the system of the disc player; and when they match, the first-area recorded-content information of the block is displayed and a read count corresponding to the language code of the block is incremented.

2. A recorded-content information display method for a disc player according to claim 1, wherein the language code of each block is read from a block;

the language code of each block is compared with the maximum-count language code to determine whether there is a block having the maximum-count language code; and when the block exists, first-area recorded-content information is read from the block and displayed.

3. A recorded-content information display method for a disc player according to claim 1, wherein it is determined whether the first-area recorded-content information of the block having the maximum-count language code can be displayed by analyzing the character code of the block, and when it is determined that the first-area recorded-content information can be displayed, the first-area recorded-content information is displayed.

4. A recorded-content information display method for a disc player according to claim 3, wherein a read count corresponding to the language code of the displayed first-area recorded-content information is incremented.

5. A recorded-content information display method for a disc player according to claim 1, wherein when the character code of each block does not match the first-priority character code, the same control is repeated for a second-priority character code determined by the system.

6. A recorded-content information display method for a disc player according to claim 1, wherein it is determined whether a loaded disc is a CD-R; and when it is determined that the loaded disc is a CD-R, a display process is executed for the first-area recorded-content information.

7. A recorded-content information display method for a disc player according to claim 1, wherein a sequence number is assigned to each segment having a predetermined size in the second area, and the last sequence numbers of all blocks are recorded in each block;

the top sequence number of a target block is obtained by using the last sequence number of each block; and a pickup is positioned at the top of the target block by using the current sequence number and the top sequence number.

8. A disc player capable of accepting a disc which is provided with a first area for recording musical data and a second area for recording information related to the content of what is recorded in the first area, this information being called first-area recorded-content information, and in which the first-area recorded-content information is recorded in each of a plurality of blocks provided for the second area by a different combination of a character code and a language code, for reading the first-area recorded-content information from a designated block in the disc and for displaying it in a designated language, the disc player comprising:

a reading section for reading the first-area recorded-content information from the designated block;

a display section for displaying the read first-area recorded-content information in the designated language;

counting means for counting and saving a read count corresponding to the language when the first-area recorded-content information is displayed in the designated language; and a control section for, when a new disc is loaded, determining whether the disc has a block in which first-area recorded-content information has been recorded by a language which has the maximum read count, this language being called a maximum-count language, and for, if the block exists, reading the first-area recorded-content information from the block and displaying it in the language on the display section;

wherein the control section reads, when the total of read counts corresponding to language codes is larger than a specified value, the first-area recorded-content information from the block having the maximum-count language code and displays it on the display section, and the display section reads, when the total is equal to or smaller than the specified value, a character code sequentially from each block; determines whether the character code matches a first-priority character code determined by the system of the disc player; displays, when they match, the first-area recorded-content information of the block on the display section; and the counting means increments a read count corresponding to the language code of the block.

9. A disc player according to claim 8, wherein the reading section reads the language code of each block from a block;

the control section compares the language code of each block with the maximum-count language code to determine whether there is a block having the maximum-count language code; and when the block exists, the display section reads the first-area recorded-content information from the block and displays it.

10. A disc player according to claim 8, wherein the control section determines whether the first-area recorded-content information of the block having the maximum-count language code can be displayed by analyzing the character code of the block, and when it is determined that the first-area recorded-content information can be displayed, displays the first-area recorded-content information on the display section.

11. A disc player according to claim 10, wherein the counting means increments a read count corresponding to the language code of the first-area recorded-content information displayed on the display section.

12. A disc player according to claim 8, wherein the control section repeats, when the character code of each block does not match the first-priority character code, the same control for a second-priority character code determined by the system.

13. A disc player according to claim 8, wherein the reading section determines whether a loaded disc is a CD-R; and the control section displays, when it is determined that the loaded disc is a CD-R, the first-area recorded-content information on the display section.

14. A disc player according to claim 8, wherein the control section assigns a sequence number to each segment having a predetermined size in the second area, and records the last sequence numbers of all blocks in each block in a recording section;

obtains the top sequence number of a target block by using the last sequence number of each block; and positions a pickup at the top of the target block by using the current sequence number and the top sequence number.

* * * * *